United States Patent
Kaiser

[19]

[11] Patent Number: 5,851,468

[45] Date of Patent: Dec. 22, 1998

[54] REINFORCING STRUCTURAL REBAR AND METHOD OF MAKING THE SAME

[76] Inventor: Mark A. Kaiser, 1620 Van Buren, Elida, Ohio 45807

[21] Appl. No.: 919,055

[22] Filed: Aug. 27, 1997

Related U.S. Application Data

[60] Division of Ser. No. 527,976, Sep. 14, 1995, Pat. No. 5,702,816, which is a continuation-in-part of Ser. No. 267,772, Jun. 28, 1994, Pat. No. 5,763,042.

[51] Int. Cl.⁶ .................................................. B29C 47/00
[52] U.S. Cl. .................. 264/177.13; 264/134; 264/174; 264/211.14; 264/211.18; 264/211.22; 428/375
[58] Field of Search ..................................... 264/134, 174, 264/211.14, 211.18, 211.22, 177.13; 428/375

[56] References Cited

U.S. PATENT DOCUMENTS

| | | | |
|---|---|---|---|
| T101,401 | 1/1982 | Zion | 264/25 |
| 2,425,883 | 8/1947 | Jackson | 72/59 |
| 3,235,429 | 2/1966 | Boggs | 156/441 X |
| 3,700,752 | 10/1972 | Hutchinson | 260/859 R |
| 3,721,643 | 3/1973 | Vargiu et al. | 260/40 R |
| 3,769,127 | 10/1973 | Goldsworthy et al. | 156/425 X |
| 3,793,108 | 2/1974 | Goldsworthy | 156/180 |
| 3,853,656 | 12/1974 | McNeely et al. | 156/441 X |
| 3,886,229 | 5/1975 | Hutchinson et al. | 260/859 R |
| 3,929,929 | 12/1975 | Kuehn | 260/859 R |
| 3,959,209 | 5/1976 | Lake | 260/40 R |
| 4,062,826 | 12/1977 | Hutchinson et al. | 260/40 TN |
| 4,067,845 | 1/1978 | Epel et al. | 260/40 R |
| 4,110,120 | 8/1978 | Rosenberg et al. | 106/99 |
| 4,128,537 | 12/1978 | Markiewitz | 528/49 |
| 4,252,696 | 2/1981 | McQuarrie | 260/16 |
| 4,276,337 | 6/1981 | Coonrod | 428/134 |
| 4,296,020 | 10/1981 | Magrans, Jr. | 260/37 N |
| 4,302,201 | 11/1981 | Stout | 428/36 |
| 4,394,338 | 7/1983 | Fuwa | 264/135 |
| 4,440,593 | 4/1984 | Goldsworthy | 156/441 |
| 4,445,957 | 5/1984 | Harvey | 156/180 |
| 4,462,946 | 7/1984 | Goldsworthy | 264/23 |
| 4,481,056 | 11/1984 | Kuhl | 156/441 X |
| 4,564,540 | 1/1986 | Davies et al. | 428/34 |
| 4,605,254 | 8/1986 | Carmien | 294/57 |

(List continued on next page.)

FOREIGN PATENT DOCUMENTS

| | | |
|---|---|---|
| 0 105 809 A2 | 4/1984 | European Pat. Off. . |
| 0 291 023 A2 | 5/1988 | European Pat. Off. . |
| 0 514 718 A1 | 11/1992 | European Pat. Off. . |
| 0 560 362 A2 | 9/1993 | European Pat. Off. . |
| 0 650 362 | 9/1993 | European Pat. Off. . |
| 0 579 163 A2 | 1/1994 | European Pat. Off. . |
| 0 612 607 | 8/1994 | European Pat. Off. . |
| 3703974 A1 | 8/1988 | Germany . |
| 6 1235 115 A | 10/1986 | Japan . |
| 53-09750 | 11/1993 | Japan . |

OTHER PUBLICATIONS

Database WPI; *Derwent Publications Lt.*; London, GB.

*Primary Examiner*—Merrick Dixon
*Attorney, Agent, or Firm*—Meyers Bigel Sibley & Sajovec, P.A.

[57] ABSTRACT

A structural rebar of the present invention includes: an inner core formed by pultruding reinforcing fibers of a first reinforcing material through a bath or injection system of a first resin material; and an outer cladding comprising an inner cladding layer and an outer cladding layer. The inner core contains at least about 40 percent by weight reinforcing fibers of the first reinforcing material. The inner cladding layer comprises a second resin material reinforced with reinforcing fibers of a second reinforcing material. The fibers of the second reinforcing material are preferably unidirectional and oriented substantially parallel to the fibers of the first reinforcing material. The outer cladding layer comprises a corrosion-resistant third resin material reinforced with a third reinforcing material. Rebar of this configuration can have sufficient strength, rigidity, and corrosion resistance to be suitable for use in cementitious structural members.

13 Claims, 1 Drawing Sheet

U.S. PATENT DOCUMENTS

| | | | |
|---|---|---|---|
| 4,612,744 | 9/1986 | Shamash | 52/220 |
| 4,620,401 | 11/1986 | L'Esperance et al. | 52/309.15 |
| 4,681,722 | 7/1987 | Carter et al. | 264/171 |
| 4,725,491 | 2/1988 | Goldfein | 428/312.4 |
| 4,752,513 | 6/1988 | Rau et al. | 428/91 |
| 4,804,427 | 2/1989 | Paul et al. | 156/181 |
| 4,812,343 | 3/1989 | Kiekhaefer et al. | 428/35.6 |
| 4,876,143 | 10/1989 | Sugita et al. | 428/294 |
| 4,883,552 | 11/1989 | O'Connor et al. | 156/180 |
| 4,892,764 | 1/1990 | Drain et al. | 428/34.5 |
| 4,935,279 | 6/1990 | Peko et al. | 428/74 |
| 4,958,961 | 9/1990 | Herbst et al. | 405/260 |
| 5,015,514 | 5/1991 | Rinehart | 428/36.4 |
| 5,047,104 | 9/1991 | Preis et al. | 156/86 |
| 5,077,113 | 12/1991 | Kakihara et al. | 428/108 |
| 5,077,326 | 12/1991 | Shibata et al. | 523/523 |
| 5,084,222 | 1/1992 | Glemet et al. | 264/136 |
| 5,098,496 | 3/1992 | Breitigam et al. | 156/180 |
| 5,100,738 | 3/1992 | Graf | 428/613 |
| 5,114,633 | 5/1992 | Stewart | 264/23 |
| 5,120,380 | 6/1992 | Strachan | 156/164 |
| 5,127,954 | 7/1992 | Johnston et al. | 106/644 |
| 5,139,843 | 8/1992 | Murakami et al. | 428/116 |
| 5,139,845 | 8/1992 | Beckerman et al. | 428/117 |
| 5,152,945 | 10/1992 | Thicthener et al. | 264/136 |
| 5,156,787 | 10/1992 | Booher | 264/135 |
| 5,166,230 | 11/1992 | Stecker | 523/500 |
| 5,174,844 | 12/1992 | Tong | 156/180 |
| 5,182,064 | 1/1993 | Ishizuka et al. | 264/137 |
| 5,183,694 | 2/1993 | Webb | 428/67 |
| 5,200,261 | 4/1993 | Taguchi et al. | 428/245 |
| 5,211,669 | 5/1993 | Bonnes et al. | 16/110 R |
| 5,212,234 | 5/1993 | Van Gasse et al. | 525/43 |
| 5,234,333 | 8/1993 | Rhodes, Jr. et al. | 425/391 |
| 5,271,193 | 12/1993 | Olsen et al. | 52/19 |
| 5,290,407 | 3/1994 | Syrett et al. | 204/147 |
| 5,322,582 | 6/1994 | Davies et al. | 156/180 |
| 5,324,377 | 6/1994 | Davies | 156/180 |
| 5,421,931 | 6/1995 | Carmien | 156/166 X |
| 5,593,536 | 1/1997 | Kaiser | 156/433 | ements
REINFORCING STRUCTURAL REBAR AND METHOD OF MAKING THE SAME

RELATED APPLICATIONS

This application is a divisional of application Ser. No. 08/527,976, filed Sep. 14, 1995, which is now U.S. Pat. No. 5,702,816, which is a continuation-in-part application of U.S. patent application Ser. No. 08/267,772 filed Jun. 28, 1994, U.S. Pat. No. 5,763,042, Jun. 9, 1998 the disclosure of which is hereby incorporated herein in its entirety.

FIELD OF THE INVENTION

The invention relates to reinforcing rebar particularly adapted to reinforce cementitious materials such as concrete, and to a method of forming such reinforcing rebar.

BACKGROUND OF THE INVENTION

Concrete and other masonry or cementitious materials have high compressive strength but relatively low tensile strength. When concrete is employed as a structural member, such as in a building, bridge, pipe, pier, culvert, or the like, it is conventional to incorporate reinforcing members to enhance the tensile strength of the structure. Historically, the reinforcing members are steel or other metal reinforcing rods or bars, i.e., "rebar". Such reinforcing members may be placed under tension to form prestressed or positioned concrete structures.

Although steel and other metals can enhance the tensile strength of a concrete structure, they are susceptible to oxidation. For example, ferrous metal rusts by the oxidation thereof to the corresponding oxides and hydroxides of iron by atmospheric oxygen in the presence of water. When it is poured, concrete is normally at a pH of 12 to 14 (i.e., at high alkalinity) due to the presence of hydroxides of sodium, potassium, and calcium formed during the hydration of the concrete. As long as a pH in this range is maintained, steel within the concrete is passive, which results in long-term stability and corrosion resistance.

Exposure to a strong acid, or otherwise lowering the pH of concrete, can cause steel contained in concrete to be corroded. For example, chlorine ions permeating into the concrete can cause corrosion. Sources of chlorine ions include road salt, salt air in marine environments, and salt-contaminated aggregate (e.g., sand) used in making the concrete. When the reinforcing steel corrodes, it can expand and create internal stresses in the concrete. These internal stresses can lead to cracking, and ultimately disintegration, of the concrete. Moreover, cracking and crumbling concrete exposes additional steel to atmospheric oxygen, water, and sources of chlorine ions.

Such structural damage has become a major problem in a wide variety of geographical areas. For example, bridges and other concrete building infrastructures in northern United States cities are constantly in need of repair because of the salting of roadways after winter snowstorms. Also, bridges leading to the Keys in Florida are continuously exposed to sea air; these bridges are regularly rebuilt because of the short lifespan of the concrete. As another example, buildings in Saudi Arabia and the Middle East, where concrete is typically made using the acidic sand of the region, are often in need of repair.

Various solutions to the corrosion problem of steel rebar have been offered; however these solutions have been largely unsuccessful. Noncorrosive coatings on the concrete, the steel rebar, or both have been proposed. For example, U.S. Pat. No. 5,271,193 to Olsen et al. proposes a steel-reinforced concrete product, such as a manhole cover, having a coating of a corrosion-resistant gel coat layer and an intermediate layer of fiberglass between the concrete and the gel coat layer. The gel coat layer is described as being a "hardenable polymeric fluid material." U.S. Pat. No. 4,725,491 to Goldfein proposes steel rebar members having chemical conversion iron oxide coatings, such as black iron oxide. U.S. Pat. No. 5,100,738 to Graf proposes steel rebar having an outer layer of a synthetic material (e.g., epoxy resin) and an intermediate layer of aluminum or aluminum alloy between the outer layer and the steel. Unfortunately, in general these exemplary coatings tend to be expensive and have received mixed results and acceptance.

There has also been interest in replacing steel with various fiber-reinforced resins. For example, U.S. Pat. No. 5,077,133 to Kakihara et al. proposes an inner filament bundle layer spirally wound around a fiber-reinforced core, a plurality of intermediate filament bundles oriented axially along the core, and an outer filament bundle spirally wound around the core and the other bundles. U.S. Pat. No. 4,620,401 to L'Espérance et al. proposes a fiber reinforced thermosetting resin core and a plurality of continuous fibers helically wound around the core and impregnated with the thermosetting resin. The fiber-reinforced rods proposed in L'Espérance have manufacturing limitations and are difficult to manufacture continuously and rapidly. Additionally, the winding of filaments onto a core tends to reduce the tensile strength of the core and can cause wicking problems.

In view of the foregoing, there continues to be a need for a synthetic reinforcing rebar to replace steel and metal rebar without sacrificing the physical properties attributed to steel and metal rebar.

SUMMARY OF THE INVENTION

With the foregoing in mind, it is an object of the present invention to provide a structural rebar which can enhance the tensile strength of cementitious materials such as concrete.

It is another object of the present invention to provide a structural rebar which is resistant to corrosion and thereby reduces the cracking and crumbling of the cementitious material.

These and other objects are satisfied by the present invention, which as a first aspect includes a reinforcing structural rebar. The structural rebar comprises: an inner core formed by pultruding reinforcing fibers of a first reinforcing material through a bath or injection system of a first resin material; and an outer cladding comprising an inner cladding layer and an outer cladding layer. The inner core contains at least about 40 percent by weight reinforcing fibers of the first reinforcing material. The inner cladding layer comprises a second resin material reinforced with reinforcing fibers of a second reinforcing material. The fibers of the second reinforcing material are preferably unidirectional and oriented substantially parallel to the fibers of the first reinforcing material. The outer cladding layer comprises a corrosion-resistant third resin material reinforced with a third reinforcing material which is preferably inorganic. Rebar of this configuration can have sufficient strength, rigidity, and corrosion resistance to be suitable for use in cementitious structural members.

DETAILED DESCRIPTION OF THE INVENTION

The present invention will now be described more fully hereinafter. This invention may, however, be embodied in many different forms and should not be construed as limited to the embodiment set forth herein; rather, this embodiment is provided so that this disclosure will be thorough and complete, and will fully convey the scope of the invention to those skilled in the art.

Figure 1:
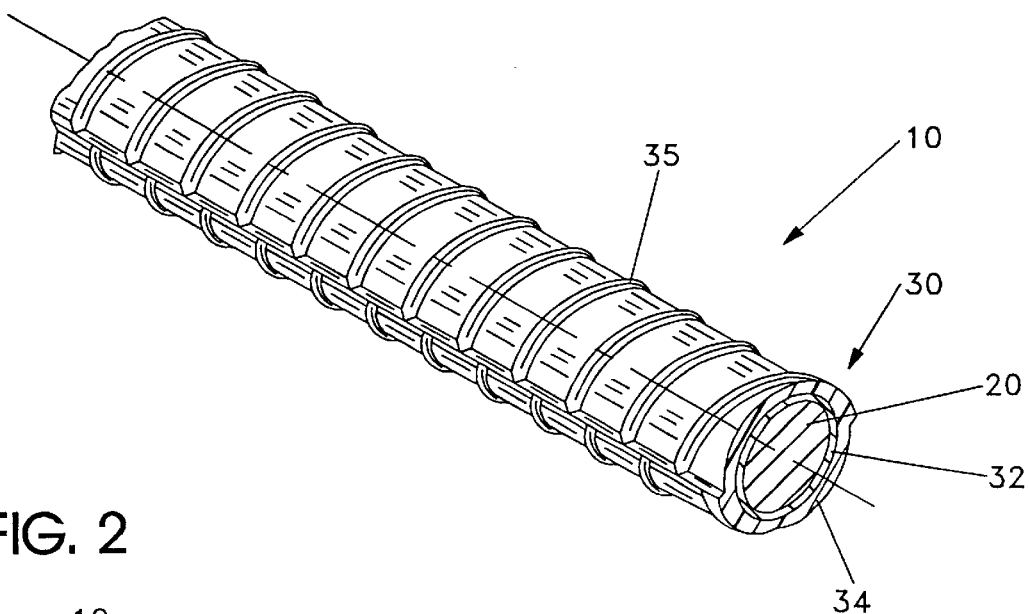
FIG. 1 is a perspective view of a reinforcing structural rebar in accordance with the present invention.
Figure 2:
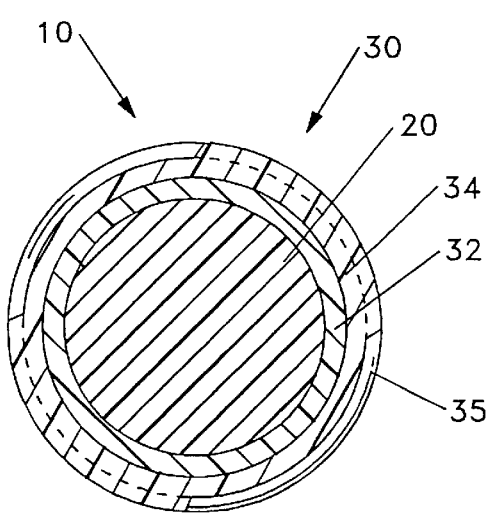
FIG. 2 is a cross-sectional view of the reinforcing structural rebar taken substantially along line 2—2 of FIG. 1.

As summarized above and as shown in FIGS. 1 and 2, the reinforcing structural rebar 10 of the present invention comprises an inner core 20 formed by pultruding reinforcing fibers through a bath or injection system of a first resin material, and an outer cladding 30. The outer cladding 30 comprises an inner cladding layer 32 adjacent the core 20 and an outer cladding layer 34 adjacent the inner cladding layer 32. The inner cladding layer comprises a corrosion-resistant second resin material reinforced with unidirectional reinforcing fibers of a second reinforcing material. The outer cladding layer 34 comprises a corrosion-resistant third resin material reinforced with a ceramic third reinforcing material. The outer cladding layer 34 includes an external profile 35 (e.g., external ribs or other projections) that assist in the bonding between the rebar 10 and a cementitious material.

First Resin Material

The first resin material is preferably a thermosetting resin. The term "thermosetting" as used herein refers to resins which irreversibly solidify or "set" when completely cured. Suitable thermosetting resins include unsaturated polyester resins, phenolic resins, vinyl ester resins, polyurethanes, and the like, and mixtures and blends thereof. Particularly preferred thermosetting resins are ATLAC™ 31-727 and POLYLITE™ 31,041-00, available from Reichhold Chemicals, Inc., Research Triangle Park, N.C.

Additionally, the thermosetting resins useful in the present invention may be mixed with other thermosetting or thermoplastic resins. Exemplary other thermosetting resins include epoxies. Exemplary thermoplastic resins include polyvinylacetate, styrene-butadiene copolymers, polymethylmethacrylate, polystyrene, cellulose acetatebutyrate, saturated polyesters, urethane-extended saturated polyesters, methacrylate copolymers, polyethylene terephthalate (PET), and the like in a manner known to one skilled in the art.

Unsaturated polyester, phenolic and vinyl ester resins are the preferred thermosetting resins of the present invention. Suitable unsaturated polyester resins include practically any esterification product of a polybasic organic acid and a polyhydric alcohol, wherein either the acid or the alcohol, or both, provide the reactive ethylenic unsaturation. Typical unsaturated polyesters are those thermosetting resins made from the esterification of a polyhydric alcohol with an ethylenically unsaturated polycarboxylic acid. Examples of useful ethylenically unsaturated polycarboxylic acids include maleic acid, fumaric acid, itaconic acid, dihydromuconic acid and halo and alkyl derivatives of such acids and anhydrides, and mixtures thereof. Exemplary polyhydric alcohols include saturated polyhydric alcohols such as ethylene glycol, 1,3-propanediol, propylene glycol, 1,3-butanediol, 1,4-butanediol, 2-ethylbutane-1,4-diol, 1,5-pentanediol, 1,6-hexanediol, 1,7-heptanediol, 1,8-octanediol, 1,4-cyclohexanediol, 1,4-dimethylolcyclohexane, 2,2-diethylpropane-1,3-diol, 2,2-diethylbutane-1,3-diol, 3-methylpentane-1,4-diol, 2,2-dimethylpropane-1,3-diol, 4,5-nonanediol, diethylene glycol, triethylene glycol, dipropylene glycol, glycerol, pentaerythritol, erythritol, sorbitol, mannitol, 1,1,1-trimethylolpropane, trimethylolethane, hydrogenated bisphenol-A and the reaction products of bisphenol-A with ethylene or propylene oxide.

The first resin can be formed by the addition of recycled PET, such as from soda bottles to the base resin prior to polymerization. PET bottles can be ground and deploymerized in the presence of a glycol, which produces an oligomer. The oligomer can then be added to a polymerization mixture containing polyester monomer and polymerized with such monomer to an unsaturated polyester.

Unsaturated polyester resins can also be derived from the esterification of saturated polycarboxylic acid or anhydride with an unsaturated polyhydric alcohol. Exemplary saturated polycarboxylic acids include oxalic acid, malonic acid, succinic acid, methylsuccinic acid, 2,2-dimethylsuccinic acid, 2,3-dimethylsuccinic acid, hydroxylsuccinic acid, glutaric acid, 2-methylglutaric acid, 3-methylglutaric acid, 2,2-dimethylglutaric acid, 3,3-dimethylglutaric acid, 3,3-diethylglutaric acid, adipic acid, pimelic acid, suberic acid, azelaic acid, sebacic acid, phthalic acid, isophthalic acid, terephthalic acid, tetrachlorophthalic acid, tetrabromophthalic acid, tetrahydrophthalic acid, 1,2-hexahydrophthalic acid, 1,3-hexahydrophthalic acid, 1,4-hexahydrophthalic acid, 1,1-cyclobutanedicarboxylic acid and trans-1,4-cyclohexanedicarboxylic acid.

Unsaturated polyhydric alcohols which are suitable for reacting with the saturated polycarboxylic acids include ethylenic unsaturation-containing analogs of the above saturated alcohols (e.g., 2-butene-1,4-diol).

Suitable phenolic resins include practically any reaction product of a aromatic alcohol with an aldehyde. Exemplary aromatic alcohols include phenol, orthocresol, metacresol, paracresol, Bisphenol A, p-phenylphenol, p-tert-butylphenol, p-tert-amylphenol, p-tert-octylphenol and p-nonylphenol. Exemplary aldehydes include formaldehyde, acetaldehyde, propionaldehyde, phenylacetaldehyde, and benzaldehyde. Particularly preferred, are the phenolic resins prepared by the reaction of phenol with formaldehyde.

Suitable vinyl ester resins include practically any reaction product of an unsaturated polycarboxylic acid or anhydride with an epoxy resin. Exemplary acids and anhydrides include (meth)acrylic acid or anhydride, α-phenylacrylic acid, α-chloroacrylic acid, crotonic acid, mono-methyl and mono-ethyl esters of maleic acid or fumaric acid, vinyl acetic acid, cinnamic acid, and the like. Epoxy resins which are useful in the preparation of the polyvinyl ester are well known and commercially available. Exemplary epoxies include virtually any reaction product of a polyfunctional halohydrin, such as epichlorohydrin, with a phenol or polyhydric phenol. Suitable phenols or polyhydric phenols include for example, resorcinol, tetraphenol ethane, and various bisphenols such as Bisphenol-A, 4,4'-dihydroxydiphenylsulfone, 4,4'-dihydroxy biphenyl, 4,4'-dihydroxydiphenylmethane, 2,2'-dihydroxydiphenyloxide, and the like.

Typically, the first resin material of the present invention also includes a vinyl monomer, in which the thermosetting resin is solubilized. Suitable vinyl monomers include styrene, vinyl toluene, methyl methacrylate, p-methyl styrene, divinyl benzene, diallyl phthalate and the like. Styrene is the preferred vinyl monomer for solubilizing unsaturated polyester or vinyl ester resins.

The inner core 20 is formed by pultruding the reinforcing fibers through a resin bath. Pultrusion is an automated process for manufacturing composite materials into linear, continuous, profiles having constant cross-sections. Typically, the pultrusion process begins with reinforcing fibers which are strung from creels at the beginning of the system, to pullers at the end. The fibers typically pass through a resin bath where they are impregnated with resin. The resin impregnated fibers are continuously pulled through a die which typically has both cooling and heating zones, and which fashions the final shape of the profile. The heating zone of the die initiates and accelerates the polymerization of the resin and the profile exits as a hot, fully cured profile having a constant cross-section.

As mentioned above, the fibers may be impregnated by passing through a resin bath. This is conventionally known as a "wet-bath" pultrusion system. A second pultrusion system effects fiber impregnation by injecting resin into the fibers from a pressurized resin holding tank.

In a preferred embodiment, the thermosetting resin is thickened during the pultrusion process. The thickening can occur before, during, or after passing through the pultrusion die. The term "thickened" as used herein relates to an increase in viscosity of the resin such that the resin is transformed from a liquid to a nondripping paste form. This is often achieved by partial curing or so-called "B-staging" the resin. The term "partial curing" as used herein refers to incompletely polymerizing the resin by initiating polymerization and subsequently arresting the polymerization or controlling the polymerization so that full cure occurs at a later time. The resin being in a thickened or partially cured state, retains reactive sites, facilitates chemical bonding between the pultruded core and the outer cladding.

Thickening or partial curing is achieved in a variety of ways. For example, the thermosetting resin may be thickened by the inclusion of a thickening agent. Suitable thickening agents are commonly known to those skilled in the art and include crystalline unsaturated polyesters, polyurethanes, alkali earth metal oxides and hydroxides, and polyureas. Preferably, the thickening agent cooperates with the conditions within the die to thicken or partially cure the thermosetting resin. The conditions within the die which are required to effect the thickening or partial cure of the thermosetting resin are dependent upon the thickening agent employed, and are discussed in detail below.

Suitable resins employing a crystalline polyester thickening agent are described in U.S. Pat. No. 3,959,209 to Lake, the disclosure of which is incorporated herein by reference in its entirety. Typically, in the embodiment of the invention wherein the thermosetting resin is thickened with a crystalline polyester, the thermosetting resin comprises a thermosetting resin solubilized in a vinyl monomer. The crystalline polyesters useful in the present invention are generally ethylenically unsaturated, and react with the vinyl monomer, although one skilled in the art will appreciate that saturated crystalline polyesters may also be employed.

Methods of preparing crystalline polyester are well known in the art and include polyesterifying a symmetrical, aliphatic diol with fumaric acid, lower alkyl esters of fumaric acid, or symmetrical saturated diacids such as terephthalic acid, isophthalic acid and sebacic acid. Maleic anhydride or maleic acid or lower alkyl esters of maleic acid may also be used in the presence of an appropriate catalyst. Likewise, mixtures of fumaric acid or esters with maleic anhydride or maleic acid or its esters may also be used. Exemplary crystalline polyesters which may be employed in the present invention include polyfumarates of 1,6-hexanediol, neopentyl glycol, bis-(hydroxyethyl)resorcinol, ethylene glycol, 1,4-butanediol, 1,4-cyclohexanediol, 1,4-cyclohexanedimethanol, or bis-(hydroxyethyl) hydroquinone.

The amount of crystalline polyester added to the thermosetting resin will vary depending upon the particular thermosetting resin employed. Typically, about 2 to about 80 percent by weight of crystalline polyester is required to thicken about 20 to about 98 percent by weight of a thermosetting resin. In the embodiment of the invention wherein the first resin material including a crystalline polyester thickening agent is thickened within the die, the conditions within the die which are sufficient to thicken the first resin material typically comprise heat sufficient to thicken the first resin material. Typically, sufficient heat is provided by operating the die under conditions which include heating at least one zone of the die. In one preferred embodiment, the conditions within the die include maintaining the entry zone at a temperature of from about 25° to about 85° C., heating the center zone to a temperature of from about 35° to about 120° C., and maintaining the exit zone at a temperature of from about 0° to about 90° C.

The thermosetting resin of the present invention may also be thickened with polyurethanes. Exemplary thermosetting resin thickened with a polyurethane are described in U.S. Pat. No. 3,886,229 to Hutchinson, the disclosure of which is incorporated herein by reference in its entirety. Typically, in the embodiment of the invention wherein the thermosetting resin is thickened with a polyurethane, the first resin material comprises a thermosetting resin solubilized in a vinyl monomer.

The polyurethanes useful in the present invention typically comprise the reaction product of a polyol and an isocyanate compound. The polyol may be saturated or unsaturated. Exemplary saturated polyols include ethylene glycol, propylene glycol, butane-1,4-diol, pentane-1,5-diol, hexane-1,6-diol, di(ethylene glycol), and di(propylene glycol). Polymers of glycols may also be employed. Exemplary polymers include polytethylene glycol), poly (propylene glycol), and poly(butylene glycol) and polyols of functionality greater than two, for example, glycerol, pentaerythritol, and trialkylol alkanes, e.g., trimethylol propane, triethylol propane, tributylol propane and oxyalkylated derivatives of said trialkylol alkanes, e.g., oxyethylated trimethylol propane and oxypropylated trimethylol propane.

In the embodiment wherein the thermosetting resin is thickened with a polyurethane including an unsaturated polyol, the unsaturated polyol crosslinks the urethane groups with the ethylenically unsaturated polyester and vinyl monomer of the thermosetting resin. Exemplary unsaturated polyols include polyesters, and vinyl esters. In one particularly preferred embodiment, the unsaturated polyol is a diester of propoxylated bisphenol-A.

The isocyanate compound is typically a polyisocyanate. The polyisocyanate may be aliphatic, cycloaliphatic or aromatic or may contain in the same polyisocyanate molecule aliphatic and aromatic isocyanate groups, aliphatic and cycloaliphatic isocyanate groups, aliphatic cycloaliphatic and aromatic isocyanate groups or mixtures of any two or more polyisocyanates.

Exemplary polyisocyanates include 4,4'-diphenylmethane diisocyanate, 2,4-toluene diisocyanate, 2,6-toluene diisocyanate, isophorone diisocyanates (e.g., 3-isocyanatomethyl-3,5,5-trimethylcyclohexyl isocyanate), tetramethylene diisocyanate, pentamethylene diisocyanate, hexamethylene diisocyanate and octamethylene diisocyanate, and cycloaliphatic diisocyanates (e.g., 4,4'-dicyclohexylmethane diisocyanate).

The polyurethane may be reacted with the thermosetting resin according to any method known to those skilled in the art. The amount of polyurethane added to the first resin material will vary depending upon the particular thermosetting resin employed. Typically, the polyurethane comprises about 1 to about 60 percent by weight of the thermosetting resin.

The conditions in the die which are sufficient to thicken the first resin material including a polyurethane thickening agent typically comprise subjecting the first resin material to sufficient heat to thicken the first resin material. Typically, sufficient heat is provided by operating the die under conditions which include heating at least one zone of the die. In one preferred embodiment, the conditions within the die include maintaining the entry zone at a temperature of from about 10° to about 35° C., heating the center zone to a temperature of from about 30° to about 200° C., and maintaining the exit zone at a temperature of from about 0° to about 200° C.

The first resin material may also be thickened using a polyurea thickening agent. Suitable formulation of resins thickened with polyurea are described in U.S. Pat. No. 4,296,020 to Magrans, Jr., the disclosure of which is incorporated herein by reference in its entirety. Typically, in the embodiment of the invention wherein the first resin material is thickened with polyurea, the first resin material comprises a resin solubilized in a vinyl monomer. The polyureas useful in the present invention comprise the product of polyamines with polyisocyanates. The polyisocyanates useful in the present invention include those described above with reference to urethane thickeners. Aliphatic, cycloaliphatic and aromatic polyamines free of ethylenic saturation are preferred polyurea precursors in that they form individual polyurea chains which are relatively cross-linked with the polymer chain formed by the copolymerization of the ethylenically unsaturated resin and monomers in solution therewith.

Aryl diamines and mixtures thereof such as metaphenylene diamine, paraphenylene diamine, naphthalene diamine, benzidene, bis(4-aminophenyl)methane, 4,4'-diaminodiphenyl sulfone and halogenated derivatives such as those containing halogen on the benzenoid ring such as 3,3'-dichlorobenzidine, bis,4-amino-2-chlorophenyl (sulfone), 4-bromo-1,3-phenylene diamine, to name a few, are operable.

Low molecular weight aliphatic and cycloaliphatic diamines are also suitably employed, such as: ethylene diamine, propylene diamine, hexamethylene diamine, trimethyl hexamethylene diamine, isophorone diamine, 1-amino-3-amino-3,5,5-trimethyl cyclohexane, hydrogenated di-(aminophenyl)methane, hydrogenated methylene dianiline, diamino methane, and hydrogenated toluene diamine. The most useful of these are those that are liquids up to 75° C. For those which are solids under these conditions, vinyl monomer solutions can be employed to form the homogeneous mix rapidly. In addition, other suitable amines include polyoxyalklene polyamines and cyanoalkylated polyoxyalklene polyamines having a molecular weight of about 190 to about 2,000 with a preferred range of about 190 to about 1,000. These amines are prepared according to the procedure outlined in a U.S. Pat. No. 4,296,020 to Magrans, Jr., the disclosure of which is hereby incorporated by reference in its entirety.

The conditions in the die which are sufficient to thicken the first resin material including a polyurea thickening agent typically comprise subjecting the first resin material to sufficient heat to thicken the first resin material. Typically, sufficient heat is provided by operating the die under conditions which include heating at least one zone of the die. In one preferred embodiment, the conditions within the die include maintaining the entry zone at a temperature of from about 10° to about 35° C., heating the center zone to a temperature of from about 30° to about 200° C., and maintaining the exit zone at a temperature of from about 0° to about 200° C.

The first resin material may also be thickened using alkali earth metal oxides or hydroxides. Typical thickeners of this type include calcium and magnesium oxides or hydroxides. The addition of these components to the first resin material will transform the liquid thermosetting resin to a semi-solid or solid form. The amount of oxide or hydroxide employed will vary depending upon the particular thermosetting resin employed. Typically, the alkali metal oxide or hydroxide comprises about 1 to about 15 percent by weight of the first resin material.

In the embodiment wherein the first resin material including an alkali metal oxide or hydroxide thickening agent is thickened within the die, the conditions in the die which are sufficient to thicken the first resin material typically comprise subjecting the first resin material to heat sufficient to thicken the first resin material. Typically, sufficient heat is provided by operating the die under conditions which include heating at least one zone of the die. In one preferred embodiment, the conditions within the die include maintaining the entry zone at a temperature of from about 10° to about 35° C., heating the center zone to a temperature of from about 30° to about 130° C., and maintaining the exit zone at a temperature of from about 0° to about 80° C.

The first resin material also may include an initiator system which cooperates with the conditions of the die to thicken the first resin material by partially curing the first resin material. The initiator system may be present in addition to any of the foregoing thickening agents, or as an alternative thereto.

The initiator system may comprise any number of polymerization initiators. Where multiple polymerization initiators are employed, the initiator system typically comprises polymerization initiators which can be activated by different conditions. For simplicity, where multiple polymerization initiators are employed, we refer to the polymerization initiator requiring the least activation energy as the "first polymerization initiator", and the initiator requiring the most activation energy as the "second polymerization initiator". Any practical number of polymerization initiators having activation energies between the first and second polymerization initiators may also be incorporated into the thermosetting resin matrix. It should not be implied from our use of the terms "first" and "second" polymerization initiator that we restrict our invention to the use of no more than two polymerization initiators.

Polymerization initiators which are useful in the practice of the present invention typically include free-radical initiators. Typical free-radical initiators include peroxy initiators. The reactivity of such initiators is evaluated in terms of the 10 hour half-life temperature, that is, the temperature at which the half-life of a peroxide is 10 hours. Suitable first polymerization initiators include polymerization initiators having a low 10 hour half-life, i.e., a more reactive peroxide initiator, as compared to initiators having a higher 10 hour half-life. Suitable second polymerization initiators include polymerization initiators having a higher 10 hour half-life than the 10 hour half-life of the polymerization initiator selected as the first polymerization initiator. Exemplary free-radical initiators useful in the present invention include diacyl peroxides, (e.g., lauroyl peroxide and benzoyl peroxide), dialkylperoxydicarbonates, (e.g., di(4-tert-butylcyclohexyl) peroxy dicarbonate), tert-alkyl peroxyesters, (e.g., t-butyl perbenzoate), di-(tert-alkyl) peroxyketals, (e.g., 1,1-di-(t-amylperoxy)cyclohexane), di-tert-alkyl peroxides, (e.g., dicumyl peroxide), azo initiators, (e.g., 2,2'-azobis(isobutyronitrile), ketone peroxides, (e.g., methylethylketone peroxide and hydroperoxides).

In the embodiment wherein the initiator system comprises only one polymerization initiator, the first resin material preferably includes a vinyl monomer. The vinyl monomer and the polymerization initiator may be independently activated under different conditions thus permitting the partial polymerization of the first resin material.

The amount of polymerization initiator(s) used is dependent upon the number of initiators employed, the conditions at which the selected initiators will initiate polymerization, and the time desired for partial curing. Typically the amount of time desired for partial curing is a short period, i.e., less than 3 hours, and often less than 1 hour. In the embodiment wherein the first resin material includes only one polymerization initiator, the amount of the initiator is typically about 0.1 to about 10 percent by weight of the first resin material. In the embodiment wherein the first resin material includes two polymerization initiators, the amount used is about 0.01 to about 4 percent by weight of the first polymerization initiator and about 0 to about 5 percent by weight of the second polymerization initiator based on the weight of the first resin material.

The initiator system and amounts of each polymerization initiator incorporated into the first resin material should be such that as the resin impregnated reinforcing fiber is pultruded through the die, the conditions therein are sufficient to activate at least one, but preferably not all polymerization initiators, resulting in the partial polymerization of the first resin material. Typically, in the embodiment wherein the initiator system comprises only one polymerization initiator, the resin impregnated reinforcing fiber is pultruded through a die within which the reinforcing fiber is subjected to sufficient heat to activate the polymerization initiator without attaining the self-polymerization temperature of the first resin material. In the embodiment wherein multiple polymerization initiators are employed, typically the resin impregnated reinforcing fiber is pultruded through a die within which the reinforcing fiber is subjected to sufficient heat to activate at least one, and preferably the first, polymerization initiator to partially cure the first resin material.

The conditions in the die which are sufficient to activate at least one polymerization initiator to partially cure the thermosetting resin will depend on the particular polymerization initiator(s) and the thermosetting resin selected, and will be readily determinable by one skilled in the art. Typically, the conditions within the die which are required for the activation of at least one polymerization initiator comprise subjecting the first resin material to sufficient heat to activate the most reactive, e.g., the first polymerization initiator to partially cure the first resin material. As the prepreg exits the exit zone and is cooled, the polymerization initiated by the activation of the first polymerization initiator is arrested, providing the partially cured prepreg rather than a fully cured article.

Another method of thickening the first resin material comprises subjecting the first resin material to sufficient radiation to thicken the first resin material. Exemplary forms of radiation include ultraviolet, infrared, radiofrequency waves, microwaves, and electron beams. According to this method, the resin impregnated reinforcing fiber is pultruded through a die within which the resin impregnated reinforcing fiber is subjected to radiation. The wavelength of radiation which is sufficient to thicken the first resin material is dependent upon the form of radiation and the particular thermosetting resin employed, and is readily determinable by one skilled in the art. For example, a first resin material comprising an unsaturated polyester resin or vinyl ester resin solubilized in styrene may be thickened using ultraviolet light having a wavelength ranging from about 200 to about 600 nm.

The conditions within the die which are sufficient to thicken the first resin material typically comprise subjecting the resin impregnated reinforcing fiber to radiation of a sufficient wavelength to thicken the first resin material. Preferably, the radiation source is located at the center zone of the die so that as the resin impregnated reinforcing fiber is passed through the center zone, it is irradiated. In one embodiment, typically the entry zone of the die is maintained at a temperature of from about 10° to about 200° C., the center zone is equipped with a source of radiation operating at a predetermined wavelength, and the exit zone is maintained at a temperature of from about 10° to about 200° C. Alternatively, the radiation source may be located at either the entry or exit zone of the die.

The first resin material may be thickened using only one of the foregoing methods or by using two or more methods in combination. Any combination of the foregoing thickening methods may be used to prepare the inner core. In embodiments wherein multiple methods of thickening the first resin material are employed, the conditions within the die which are sufficient to thicken the first resin material will depend on the particular combination of thickening methods employed. The necessary conditions within the die which will effect thickening will be readily determinable by one skilled in the art.

First Reinforcing Material

The inner core 20, which comprises the first resin material and pultruded reinforcing fibers of the first reinforcing material, preferably contains at least about 40 percent by weight reinforcing fibers. Preferably, the resin of the core 20 is reinforced with at least about 0 to 65 percent by weight of resin of unidirectional fibers and at least about 65 to 0 percent by weight of resin of randomly oriented (e.g., chopped) fibers. Additionally, the core 20 may be circumferentially wound with reinforcing fibers to provide additional strength thereto and to enhance the mechanical bonding of the core 20 to the outer cladding 30.

The reinforcing fibers of the inner core 20 are preferably glass fibers. Glass fibers are readily available and low in cost. A typical glass fiber is electrical grade E-glass. E-glass fibers have a tensile strength of approximately 3450 MPa (practical). Higher tensile strengths can be accomplished with S-glass fibers having a tensile strength of approximately 4600 MPa (practical). The glass fiber can be treated to provide other properties such as corrosion resistance. Other suitable reinforcing fibers include carbon, metal, high modules organic fibers (e.g., aromatic polyamides, polybenzimidazoles, and aromatic polyimides), and other organic fibers (e.g., polyethylene, liquid crystal and nylon). Blends and hybrids of the various fibers can be used.

Second Resin Material

The second resin material of the inner cladding layer 32 of the outer cladding 30 is typically a thermosetting resin, and is generally selected from the group consisting of unsaturated polyester resins, vinyl ester resins, vinyl urethane resins, vinyl isocyanurate resins and the like and mixtures or blends thereof. It is preferred that the resin be corrosion-resistant.

Suitable unsaturated polyester and vinyl esters include those previously described. A particularly preferred thermosetting resin is a vinyl maleate urethane.

The vinyl urethane resins which are useful include those described in U.S. Pat. No. 3,929,929 to Kuehn, the disclosure of which is incorporated herein by reference in its entirety. The vinyl urethanes proposed in Kuehn are prepared by reacting a diol, a polyisocyanate, and a hydroxyl-terminated ester of acrylic or methacrylic acid. Exemplary vinyl urethanes include DION™ 31038-00 and ATLAC™ 580-05A, both of which are available from Reichhold Chemicals, Inc., Research Triangle Park, N.C.

The vinyl isocyanurate resins which are useful in the present invention include those proposed in U.S. Pat. No. 4,128,537 to Markiewitz, the disclosure of which is incorporated herein by reference. The ethylenically unsaturated isocyanurates proposed in Markiewitz are prepared by reacting a polyisocyanate with a monohydric alcohol to form a urethane, and then trimerizing the urethane to form an ethylenically unsaturated isocyanurate. An exemplary vinyl isocyanurate includes ATLAC™ 31631-00 available from Reichhold Chemicals, Inc., Research Triangle Park, N.C.

The second resin material of the present invention may also include other additives commonly employed in resin compositions, the selection of which will be within the skill of one in the art. For example, the second resin material may include reinforcing fillers, particulate fillers, selective reinforcements, thickeners, initiators, mold release agents, catalysts, pigments, flame retardants, and the like, in amounts commonly known to those skilled in the art. The particulate fillers typically include calcium carbonate, hydrated alumina and clay.

The initiator may be a high or a low temperature polymerization initiator, or in certain applications, both may be employed. Suitable mold release agents include zinc stearate, calcium stearate and stearic acid. Catalysts are typically required in resin compositions thickened with polyurethane. The catalyst promotes the polymerization of NCO groups with OH groups. Suitable catalysts include dibutyl tin dilaurate and stannous octoate. Other commonly known additives which may desirably be incorporated into the second resin material include pigments and flame retardants.

Second Reinforcing Material

The inner cladding layer 32 is reinforced with reinforcing fibers such as those previously described. In one embodiment, the inner cladding layer 32 is reinforced with between about 30 to 70 percent by weight of reinforcing material.

Preferably, the reinforcing fibers in the inner cladding layer 32 are unidirectional, but a fibrous mat is also contemplated. Unidirectional fibers should be oriented to be substantially parallel with the longitudinal axis of the rebar 10. In this configuration, the fibers can enhance the tensile and flexural strength and rigidity of the rebar 10.

Like the first reinforcing material described hereinabove, the reinforcing fibers of the inner cladding layer 32 are preferably glass fibers, as they are readily available and low in cost. Other suitable reinforcing fibers include carbon, metal, high modules organic fibers (e.g., aromatic polyamides, polybenzimidazoles, and aromatic polyimides), and other organic fibers (e.g., polyethylene, liquid crystal and nylon). Blends and hybrids of the various fibers can be used.

Third Resin Material

The third resin material, which is included in the outer cladding layer 34 and should be a corrosion-resistant material, is typically a thermosetting resin, and generally includes unsaturated polyester resins, vinyl ester resins, vinyl urethane resins, vinyl isocyanurate resins and the like and mixtures or blends thereof. The discussion hereinabove regarding the second resin material and its optional additives is equally applicable to the third resin material. It is preferred that the third resin material be a vinyl ester modified polyurethane resin; particularly preferred resins are ATLAC™ 580-05A resin and DION™ 31038-00, each of which are available from Reichhold Chemicals, Inc., Research Triangle Park, N.C. It is also preferred that the inner cladding layer 32 and the outer cladding layer 34 include the same resin material.

The third resin material may include a thickening agent. A thickening agent can increase the viscosity of the third resin material, which can be advantageous in controlling the thickness and density of the outer cladding layer 34 if the third resin material is to be injected onto the inner cladding layer 32. In addition, the thickening agent may, with some particulate and powder fillers, assist the filler to remain in solution. A preferred thickening agent is fumed silica; a particularly preferred fumed silica is Aerosil 200, available from Degussa Corporation, Ridgefield Park, N.J.

Third Reinforcing Material

The third reinforcing material is included in the outer cladding layer 34 to provide strength, rigidity, and hardness to the outer surface of the outer cladding 30. In particular, the outer surface of the outer cladding 30 should be sufficiently strong, rigid, and hard to withstand the stresses applied to projections and/or recesses comprising the profile 35 of the rebar 10 as they interact with a surrounding cementitious material and provide mechanical bonding sites thereto. Preferably, the third reinforcing material and the third resin are selected so that the rebar has a tensile strength of $9 \times 10^5$ psi, an elastic modulus of $6 \times 10^6$ psi, and a Barcol hardness of 60.

Exemplary third reinforcing materials include inorganic fillers and organic fillers. Exemplary inorganic fillers include ceramic, glass, carbon-based inorganic materials such as carbon black, graphite, and carbonoyl iron, cermet, calcium carbonate, aluminum oxide, silicon dioxide, oxides of nickel, cobalt, iron (ferric and ferrous), manganese, and titanium, perlite, talc (hydrous magnesium silicate), mica, kaolinite, nitrides of boron and aluminum, carbides of silicon, boron, and aluminum, zircon, quartz glass, aluminum hydroxide, gypsum, magnesite, ferrite, molybdinum disulfide, zinc carbonate, and blends thereof. Exemplary organic fillers include aramid and polyethylene terephthalete. These and other exemplary reinforcing materials are described in U.S. Pat. Nos. 4,278,780 to Nishikawa et al.; 4,358,522 to Shinohara et al.; 5,011,872 to Latham et al.; 5,234,590 to Etienne et al.; and 4,947,190 to Murayama et al. Preferably, the third reinforcing material includes a ceramic filler; i.e., a material that is the product of heated earthy raw materials in which silicon with its oxide and silicates, such as calcium silicate, wollastonite, beryl, mica, talc, and clays such as kaolinite, occupy a predominant position. See *Hawley's Condensed Chemical Dictionary* at 240 (11th ed. 1987). A particularly preferred ceramic filler is KZ Ceramic Powder, a proprietary ceramic powder available from Ceramic Technologies Corporation, Rowley, Iowa. In one embodiment, the ceramic filler is advantageously blended with a calcium carbonate filler in a 3:1 blend.

The reinforcing material can be supplied in many forms, including powder, fiber, sphere, bead, particle, flake, lamella, and the like. If a ceramic filler is used, preferably the filler is a powder sized between about 0.0001 and 0.003 of an inch, and more preferably is a powder sized between about 0.001 and 0.0015 inches. It is also preferred that such a ceramic filler comprise between about 10 and 50 percent, and more preferably between about 30 and 50 percent, by weight of the outer cladding layer 34.

Together, the third resin material and the third reinforcing material that comprise the outer cladding layer 34 should have a thickness of between about 0.01 and 0.2 inches, and preferably has a thickness of between about 0.025 and 0.100 inches. At this thickness, the outer cladding layer 34 is of sufficient thickness that, as the outer cladding layer 34 is preformed in a die prior to having the profile 35 molded therein, the unidirectional fibers of the inner cladding layer 32 are shielded from and therefore avoid contact with the edges of the die. As a result, these fibers can avoid receiving nicks or notches that can later lead to reduced strength and toughness.

Production of Structural Rebar

In operation, the structural rebar 10 is formed by using an apparatus such as described in commonly assigned U.S. Ser. No. 08/528,362 filed concurrently, having Attorney Docket No. 5560-7, the disclosure of which is incorporated herein by reference in its entirety. The method includes impregnating the first reinforcing fibers by pultruding the fibers through a bath of the first resin material. The impregnated fibers are subjected to conditions sufficient to thicken the first resin material, which typically occurs in the shaping die of the pultrusion apparatus. This process forms the core 20. Optionally, the core 20 may be circumferentially wound with reinforcing fibers. The inner layer 32 of the outer cladding 30 is then applied to the thickened (e.g., partially cured or B-staged) resin comprising the core 20. Preferably, the second reinforcing fibers included in the inner cladding layer 32 are unwound from a spool, immersed in a bath containing the second resin material, and applied unidirectionally to the core 20. The third resin material included in the outer cladding layer 34 is then applied over the inner cladding layer 32. Preferably, the third resin material is applied by injecting a stream of the material onto the inner cladding layer 32, then forcing the core 20, the inner cladding layer 32, and the outer cladding layer 34 through a forming tube. The rod is then pulled to a molding apparatus, which forms a profile 35 of either recesses and/or projections in the outer cladding layer 34. The profile 35 may be selected from a variety of deformation patterns, such as for example, circumferential external ribs. The mold may include a mold release layer (not shown) that can become part of the rebar or can be pealed off. This layer is typically a film and suitable film comprise polyethylene, polypropylene, or nylon, although other materials may be employed. Full cure of the resins is then completed by heating to a temperature of between about 80° to 250° C.

Figure 3:
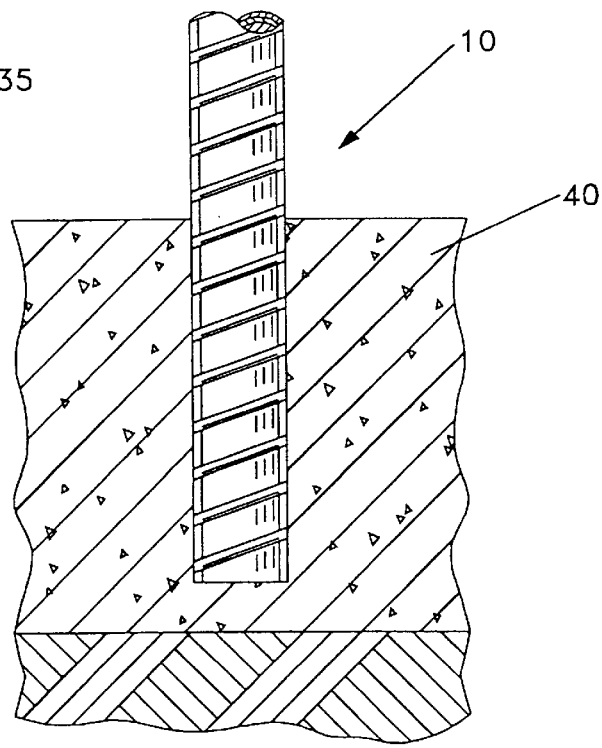
FIG. 3 is a cross-sectional view showing the reinforcing structural rebar embedded in concrete.

As shown in FIG. 3, the resulting structural reinforcing rebar is particularly adapted for reinforcing a mass 40 of cementitious material such as concrete. Concrete is a conglomerate of gravel, pebbles, sand, broken stone, and the like embedded in a matrix of either mortar or cement such as Portland cement. Portland cement is a type of hydraulic cement in the form of finely divided powder composed of lime, alumina, silica, and iron oxide. Exemplary reinforced structures include buildings, piers, bridges, culverts, pipes, and the like.

The invention is described more particularly in the following non-limiting examples.

EXAMPLE 1

Preparation of Inner Core

A conventional wet-bath pultrusion apparatus having a 0.5 inch die opening is equipped with roving strung between guides, through a resin bath, through a pultrusion die, and secured to a pulling mechanism. The resin bath is charged with 100 parts POLYLITE™ 31-041-00, 0.1 parts di-(4-tert-butylcyclohexyl) peroxy dicarbonate, 0.1 parts styrene monomer, 1.0 part t-butylperbenzoate, 3.5 parts zinc stearate internal mold release agent and 50 parts calcium carbonate filler. The entry zone of the die is chilled using cooling water, while the center zone is heated to 280° F., and the exit zone was heated to 300° F.

EXAMPLE 2

Preparation of Inner Core

A conventional wet-bath pultrusion apparatus having a 0.5 inch die opening is equipped with 30 113 yield roving strung between guides, through a resin bath, through a die, and secured to a pulling mechanism. The resin bath is charged with 100 parts polyethylene terephthalate, 10 parts calcium carbonate filler, 1 part AXEL™ mold release agent, 0.75 parts PERCADOX™ 16 polymerization initiator, and 0.5 parts ESPEROX™ 570P polymerization initiator. The entry zone of the die is chilled to about 70° F. using cooling water. The center and exit zones of the die are heated to 184° F. The roving is pultruded at a rate of about 29 in/min to produce a partially cured inner core rod.

EXAMPLE 3

Preparation of Inner Core

A conventional wet-bath pultrusion apparatus having a 0.5 inch die opening is equipped with 30 roving strung between guides, through a resin bath, through a die, and secured to a pulling mechanism. The resin bath is charged with 100 parts polyethylene terephthalate, 10 parts calcium carbonate filler, 1 part AXEL™ mold release agent, 0.75 parts PERCADOX™ 16, polymerization initiator, 0.5 parts ESPEROX™ 570P polymerization initiator, and 0.5 parts t-butylperbenzoate polymerization initiator. The entry zone of the die is chilled to about 70° F. using cooling water. The center and exit zones of the die are heated to 184° F. The roving is pultruded at a rate of 40 in/min to produce a partially cured inner core rod.

EXAMPLE 4

Preparation of Inner Cladding Layer

A core having a diameter of 0.4375 inches produced by the methods of Example 1, 2, or 3 is introduced into a secondary bath. 22 additional 113 yield rovings are saturated in a urethane modified vinyl ester resin (ATLAC™ 31-038-

OSA, available from Reichhold Chemical, Research Triangle Park, N.C.). The rovings are unidirectionally applied to the core and held to a maximum diameter of 0.625 inch by a series of bushings positioned in forming cards.

EXAMPLE 5

Preparation of Inner Cladding Layer

The core produced by any of the methods of Examples 1 through 3 is introduced into a resin bath. Also, 22 secondary additional 110 yield rovings are introduced into the resin bath. The resin bath contains a urethane modified vinyl ester resin ATLAC™ 31-0380-05A (available from Reichhold Chemicals, Inc., Research Triangle Park, N.C.). The rovings are held to a maximum diameter of 0.625 inch by a series of bushings positioned within forming cards.

EXAMPLE 6

Formation of Outer Cladding Layer

The core and inner layer formed in Examples 4 and 5 are conveyed to an injector unit containing a resin inlet and a forming sleeve. A resin containing ATLAC™ 31-038-05A, 1.5 pph fumed silica (available from Degussa Corporation, Ridgefield Park, N.J.), 35 pph KZ Ceramic Powder (available from Ceramic Technologies Corp., Rowley, Iowa). 10 pph calcium carbonate filler, 1 pph KP-250 mold release agent (available from Technick Products, Inc., Newark, N.J.), 0.5 pph PERKODOX™ 16 polymerization initiator (available from Akzo Chemicals Ltd., Toronto, Ontario), 0.5 pph styrene monomer, 0.75 pph ESPEROX 570 polymerization initiator (available from Witco, Marshall, Tex.), and 0.5 pph TRIGONOX C high temperature polymerization initiator (available from Akzo, Chemicals LTD, Toronto, Ontario). The viscosity of the filled resin is a minimum of 8500 cp at 10 rpm and 3000 cp at 100 rpm.

The rod is conveyed into the forming sleeve and resin is injected thereon. Excess resin is stripped off, allowing a heavy saturated layer of injected resin to exist on the surface.

EXAMPLE 7

Molding of Outer Cladding Layer

The preformed rod produced in Example 6 is then sandwiched between two layers of nylon film and introduced into a molding station. The molding station is described in U.S. patent application Ser. No. 08/528,362, Attorney Docket No. 5560-7, filed concurrently. The rod is conveyed through the molding station at 7 ft/min. The hydraulic pressure applied to the rod through the mold components is 2000 psi. The temperature of each mold is at least 300° F.

Initially, rod is pulled from the injection chamber without resin being injected thereon to demonstrate that there are no deformations in the surface formed with the excess of the first and second resins. The injection chamber is then activated so that resin is injected, and the outer cladding layer is formed on the surface. As the rod exits the molding station, the nylon film is stripped free from the surface. Ignition testing conducted on the finished product indicates that the molded projections in the rod contain 40% by weight of ceramic and calcium carbonate filler.

The foregoing embodiments and examples are illustrative of the present invention, and are not to be construed as limiting thereof. The invention is defined by the following claims, with equivalents of the claims to be included therein.

That which is claimed is:

1. A method of forming a reinforcing structural rebar comprising the steps of:
    (a) impregnating reinforcing fibers by pultruding the reinforcing fibers through a bath or injection system of a first resin material;
    (b) subjecting the impregnated reinforcing fibers of step (a) to conditions sufficient to partially thicken the first resin material; and
    (c) forming a inner cladding layer over the impregnated fibers of step (b) and the partially thickened first resin impregnated in the reinforcing fibers of step (b) with a second resin material reinforced with unidirectional fibers; and
    (d) forming an outer cladding layer over the inner cladding layer of step (c) with a third resin material reinforced with a third reinforcing material.

2. The method of claim 1, wherein step (b) includes heating the impregnated reinforcing fibers in a die.

3. The method of claim 2, including step (e) comprising molding the outer cladding layer to provide a profile to the reinforcing structural rebar.

4. The method of claim 3, wherein step (b) comprises heating the impregnated fibers with heat sufficient to partially cure the first resin, and wherein the method further comprises (f) heating said rebar during step (e) with heat sufficient to complete the curing of the first resin and to cure the second and third resins.

5. The method of claim 1, wherein the first resin material includes a polymerization initiator systems including at least one polymerization initiator, and step (b) includes heating the impregnated reinforcing fibers in a die.

6. The method of claim 1, wherein step (d) comprises injecting the third resin material over the inner cladding layer.

7. A method of forming a reinforcing structural rebar, comprising the steps of:
    (a) forming a core of pultruded unidirectional reinforcing fibers impregnated with a first resin material;
    (b) forming an inner cladding layer of pultruded unidirectional reinforcing fibers impregnated with a second resin material different from the first resin material over the core; and
    (c) forming an outer cladding layer comprising non-unidirectional reinforcing fibers impregnated with a third resin material over the inner cladding layer.

8. A method according to claim 5, further comprising the step of molding a profile into the outer cladding layer.

9. A method according to claim 8, wherein the outer cladding layer is injected onto a substantially uncured inner cladding layer and the outer cladding layer and inner cladding layer are drawn into a mold substantially uncured.

10. A method according to claim 8, further comprising the step of heating the rebar during said molding step with heat sufficient to complete the curing of the first resin and to cure the second and third resins.

11. A method according to claim 8, wherein the non-unidirectional reinforcing fibers include spherically shaped fibers.

12. A method according to claim 7, wherein the core is formed by pulling the unidirectional fibers through a forming device and heating the resin impregnated fibers to a temperature sufficient to partially cure the first resin material prior to forming the inner cladding layer thereon.

13. A method according to claim 7, wherein the core is formed by pulling the unidirectional fibers through a die and exposing the resin impregnated fibers to an irradiation source to partially cure the first resin material prior to forming the inner cladding layer thereon.

\* \* \* \* \*

UNITED STATES PATENT AND TRADEMARK OFFICE
CERTIFICATE OF CORRECTION

PATENT NO. : 5,851,468
DATED : December 22, 1998
INVENTOR(S) : Mark A. Kaiser

It is certified that error appears in the above-identified patent and that said Letters Patent is hereby corrected as shown below:

Title page, item [54] and col. 1, in the title should read as following:
"REINFORCING STRUCTURAL REBAR AND METHOD OF MAKING THE SAME" should read –METHOD OF MAKING REINFORCED STRUCTURAL REBAR--.

Column 16, line 57, claim 8, "claim 5" should read –claim 7--.

Signed and Sealed this

Twenty-fourth Day of August, 1999

Attest:

Q. TODD DICKINSON

*Attesting Officer*  *Acting Commissioner of Patents and Trademarks*